US012495246B2

(12) United States Patent
Daftuar et al.

(10) Patent No.: US 12,495,246 B2
(45) Date of Patent: Dec. 9, 2025

(54) HEADREST WITH SIDE-FIRING LOUDSPEAKERS

(71) Applicant: Harman International Industries, Incorporated, Stamford, CT (US)

(72) Inventors: Rishi Daftuar, Ypsilanti, MI (US); David Mossington, Rochester, MI (US); Matthew Christopher Marrocco, Lapeer, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 209 days.

(21) Appl. No.: 18/531,421

(22) Filed: Dec. 6, 2023

(65) Prior Publication Data

US 2025/0193583 A1 Jun. 12, 2025

(51) Int. Cl.
*H04R 1/34* (2006.01)
*H04R 1/02* (2006.01)
*H04R 1/40* (2006.01)

(52) U.S. Cl.
CPC ............ *H04R 1/345* (2013.01); *H04R 1/025* (2013.01); *H04R 1/403* (2013.01)

(58) Field of Classification Search
CPC ......... H04R 1/345; H04R 1/025; H04R 1/403
USPC .......................................................... 381/332
See application file for complete search history.

(56) References Cited

U.S. PATENT DOCUMENTS 4,696,370 A 9/1987 Tokumo et al.
11,647,327 B2 * 5/2023 Oswald .................. H04R 1/345 381/86
2019/0039492 A1 2/2019 Von Saint-George et al.
2020/0128312 A1 * 4/2020 Christoph .............. H04R 1/403
2023/0117408 A1 * 4/2023 Vuine .................... H04R 1/025 381/398

FOREIGN PATENT DOCUMENTS

WO 2021071496 A1 4/2021

* cited by examiner

*Primary Examiner* — Sean H Nguyen
(74) *Attorney, Agent, or Firm* — Angela M. Brunetti

(57) ABSTRACT

At least one loudspeaker module having a loudspeaker driver mounted inside a headrest behind a lateral non-contact surface of the headrest and is oriented so that a central axis of radiation is along a lateral direction, x, of the headrest. A waveguide has an opening in the lateral direction, x, and an exit opening in a forward direction, y. The forward direction, y, is generally perpendicular to the lateral direction, x. The waveguide is mounted to the loudspeaker driver so that the opening aligns with a radiating surface of the loudspeaker driver and the exit opening extends along the lateral non-contact surface of the headrest exteriorly to the headrest. The opening is vertically oriented on the lateral non-contact surface of the headrest so that a central axis of radiation of the waveguide is directed toward the forward direction, y. The loudspeaker has an acoustic lens above the loudspeaker driver.

20 Claims, 5 Drawing Sheets

HEADREST WITH SIDE-FIRING LOUDSPEAKERS

TECHNICAL FIELD

The present invention relates to loudspeakers incorporated into a headrest of a seat.

BACKGROUND OF THE INVENTION

It may be desirable to mount loudspeakers into a headrest of a seat, for example, in a vehicle seat, a gaming chair, or a theater seat. Typically, the loudspeakers are positioned behind the listener in the seat and reproduce sound such as music, movie content, navigation prompts, or other audio content.

Some conventional configurations create an acoustic radiator using a front surface of the headrest, resulting in large headrests. Furthermore, radiation patterns that result from such a system configuration may degrade inter-aural performance. Because the loudspeakers are positioned behind the listener, a sound field is dependent upon listener head position. This can cause an undesirable listening experience, for example in a vehicle. When the listener turns their head to talk to another passenger in the vehicle, the loudspeakers fires directly into the listener's ear.

To address headrest size and packaging limitations, some configurations mount loudspeakers to one or more sides of the headrest. However, side-mounted loudspeakers may be inefficient when there is a need for controlling the dispersion of sound in the listening environment.

SUMMARY OF THE INVENTION

In one or more embodiments, a loudspeaker module, for mounting in a headrest, has a first loudspeaker driver mounted inside the headrest behind a first lateral non-contact surface of the headrest and is oriented so that a central axis of radiation is along a lateral direction, x, of the headrest. A first waveguide has an opening in the lateral direction, x, and an exit opening in a forward direction, y. The forward direction, y, is generally perpendicular to the lateral direction, x. The first waveguide is mounted to the first loudspeaker driver so that the opening aligns with a radiating surface of the first loudspeaker driver and the exit opening extends along the first lateral non-contact surface of the headrest exteriorly to the headrest. The first exit opening is vertically oriented on the first lateral non-contact surface of the headrest so that a central axis of radiation of the waveguide is directed toward the forward direction, y.

In one or more embodiments, the loudspeaker has an acoustic lens above the loudspeaker driver.

In one or more embodiments, the first waveguide is mounted exteriorly to the first lateral non-contact surface of the headrest.

In one or more embodiments the exit opening extends a listening direction, in a non-converging manner, towards the forward direction.

In one or more embodiments, The exit opening is longer in a direction perpendicular to the central axis of radiation than in a direction parallel to the central axis of radiation.

In one or more embodiments, the exit opening has an upper wall length that is different than a lower wall length. And, in one or more embodiments, lateral walls of the exit opening slope from the upper wall to the lower wall.

In one or more embodiments, a second loudspeaker module is mounted inside the headrest behind a second lateral non-contact surface of the headrest, wherein the loudspeaker assembly is a pair of loudspeaker drivers mounted inside the headrest and spaced apart from each other.

BRIEF DESCRIPTION OF DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION OF THE INVENTION

Detailed embodiments of the present invention are described herein. However, it is understood that the disclosed embodiments are merely exemplary, and the invention may be embodied in various alternative forms. The figures are not necessarily drawn to scale. Some features may be exaggerated or minimized to show details of particular components. Therefore, specific structural and functional details disclosed herein are not to be interpreted as limiting, but merely as a representative basis for teaching one skilled in the art to employ the present invention.

The description hereinafter will be described in a listening environment in a vehicle, but it should be noted that embodiments of the inventive subject matter may be applicable to other listening environments, such as, for example, but not limited to, a home, a theater, or a gaming environment. Vehicle sound systems may benefit from individual sound reproduction for each passenger (also referred to as a listener). Loudspeaker locations in the vehicle headrest are intended to provide better seat-to-seat separation. For example, the driver may be listening to navigation prompts while the other passengers are listening to other audio content, such as music.

Acoustically, loudspeakers in the headrest have the advantage that mainly the listener sitting in the seat may hear sound from the loudspeaker without disturbing other listeners. However, the loudspeakers in the headrest are close to the listener's head causing large sound variations depending on the listener's head position. Further, speakers in the headrest may be covered by the occupant's head. Side-firing speakers, speakers positioned on the sides of the headrest, are known to transmit audio toward the sides of the headrest. While this may solve some positioning issue, side-firing speakers generally provide audio that is not limited to audio content intended only for the occupant directly in front of the headrest, defeating the purpose of an individual sound zone with seat-to-seat separation afforded by front-firing loudspeakers.

Aspects disclosed herein generally provide, but are not limited to, a side-oriented loudspeaker configuration with a waveguide that directs audio content to a front side of the headrest for an occupant directly in front of the headrest.

Figure 1:
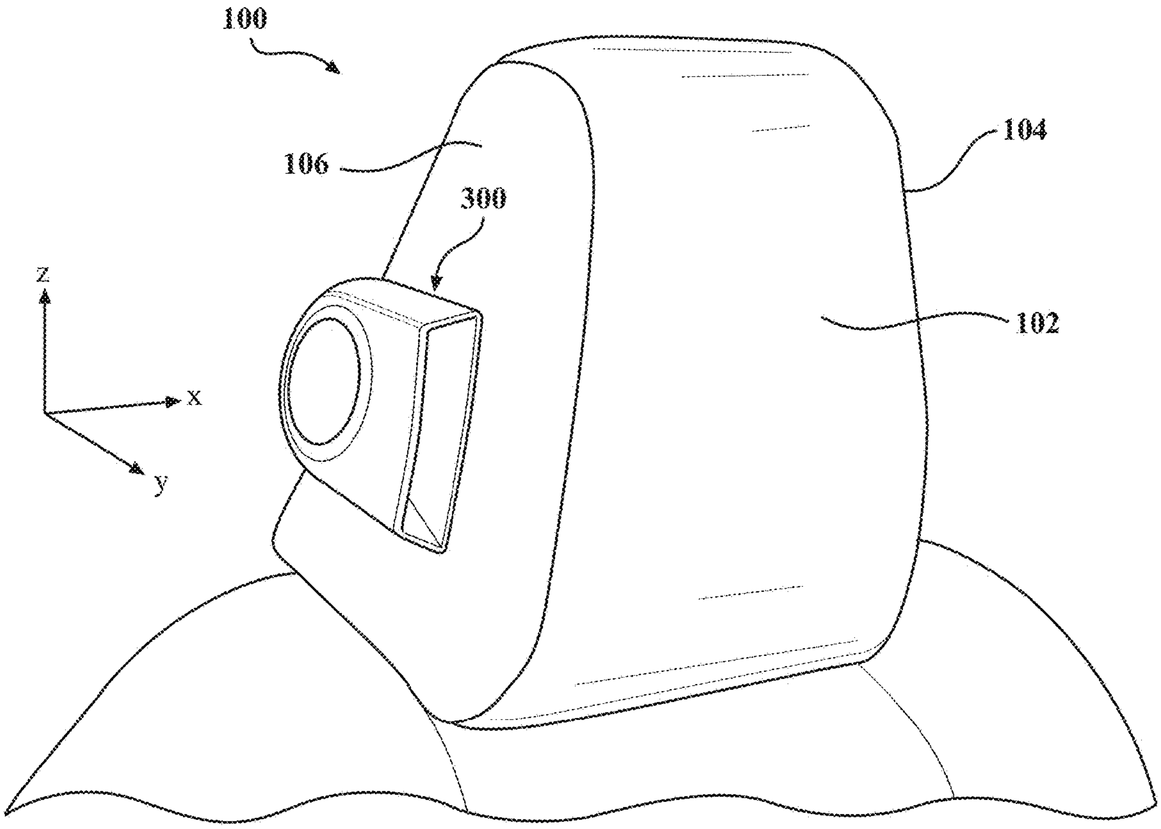
FIG. 1 is a perspective view of a headrest and a loudspeaker module according to one or more embodiments of the inventive subject matter.

FIG. 1 generally depicts a headrest 100 with a loudspeaker assembly 300 integrated in the headrest 100. The headrest 100 has a forward contact surface 102 facing in a forward direction, y. The headrest 100 has a left lateral side non-contact surface 104, and a right lateral side non-contact surface 106 each facing a lateral direction, x. Non-contact surface refers to a surface that does not come into contact with an occupant (not shown) of the seat. Centerline refers to a middle of the forward contact surface 102 of the head rest 100 in the forward direction, y.

Figure 2:
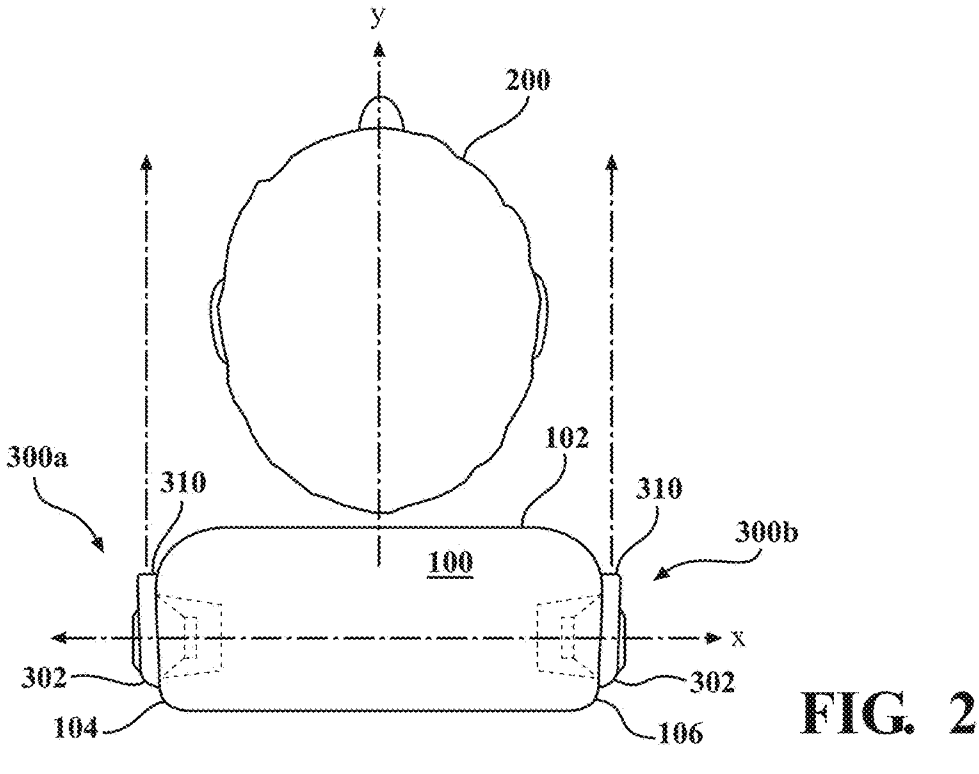
FIG. 2 is a top section view of the headrest of FIG. 1.

FIG. 2 is a top section view of the headrest 100 showing a loudspeaker assembly 300 consisting of a pair of loudspeaker modules 300*a*, 300*b* spaced apart in the lateral direction, x, mounted inside the headrest 100. In the embodiment shown in FIG. 2, loudspeaker module 300*a* is mounted behind the left lateral side non-contact surface 104 and loudspeaker module 300*b* is mounted behind the right lateral side non-contact surface, 106 of the headrest 100. Each loudspeaker module 300*a*, 300*b* has a horn waveguide (hereinafter, waveguide) 302 mounted thereto and an exit opening 310 of the waveguide 302, is exposed exteriorly to the headrest 100. An occupant 200 is shown at the forward contact surface 102 facing the forward direction, y.

Figure 3:
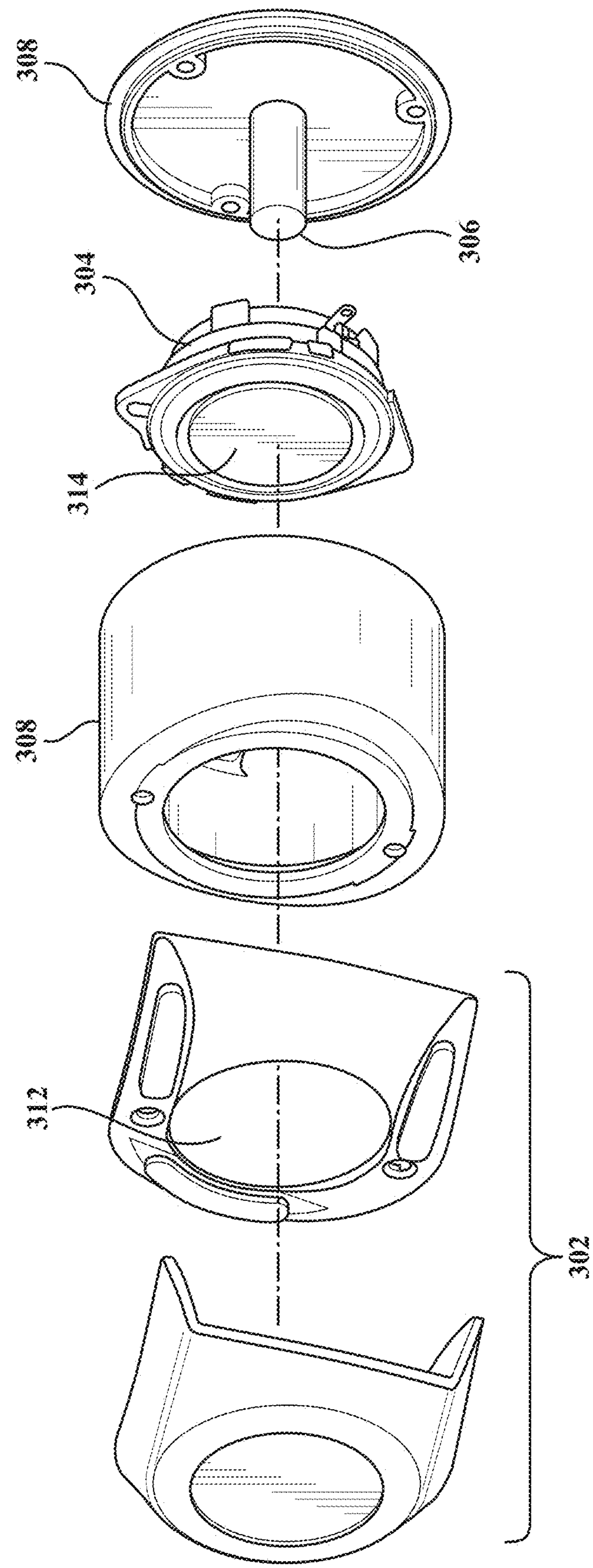
FIG. 3 is an exploded view of one or more embodiments of the loudspeaker module.

FIG. 3 is an exploded view of the loudspeaker module 300*a*, 300*b*. Each loudspeaker module 300*a*, 300*b* generally includes a loudspeaker driver 304. The loudspeaker driver 304 is mounted in an enclosed housing 308 and may be supported by a carrier tube (or push rod) 306. The waveguide 302 is mounted to a top surface of the housing 308 above the loudspeaker driver 304. The loudspeaker driver 304 and housing 308 are mounted interiorly to the headrest (not shown). A first opening 312 of the waveguide generally corresponds with a radiating surface 314 of the loudspeaker driver 304. In the embodiment shown in FIG. 2, the first opening 312 and the radiating surface 314 are generally circular. It should be noted that any suitable shape that connects the loudspeaker driver 304 and the first opening 312 of the waveguide 302 may be possible without departing from the scope of the inventive subject matter.

Referring back to FIG. 2, the loudspeaker driver (not shown) in the loudspeaker module 300*a* and the loudspeaker module 300*b*, has a central axis of radiation in the lateral, x, direction. Each loudspeaker driver (not shown) in the loudspeaker modules 300*a*, 300*b* is side-facing and side-firing, in the lateral direction, x. The exterior waveguide 302 and waveguide exit opening 310 are configured to radiate audio from the loudspeaker driver (not shown), in a non-converging manner, toward the forward direction, y, relative to the front surface 102 of the headrest 100. The exit opening 310 extends the listening direction towards the forward direction, y, in a manner that does not converge towards the centerline of the headrest 100.

In one or more embodiments, an entirety of the waveguide 302 structure is mounted exteriorly to the lateral side non-contact surface 104, 106 of the headrest 100. In one or more embodiments, not shown, at least the exit opening 310 of the waveguide 302 is exteriorly placed on the lateral side non-contact surface 104, 106 of the headrest 100 and the rest of the waveguide 302 structure is positioned interiorly to the headrest at the lateral side non-contact surface 102, 104.

Figure 4:
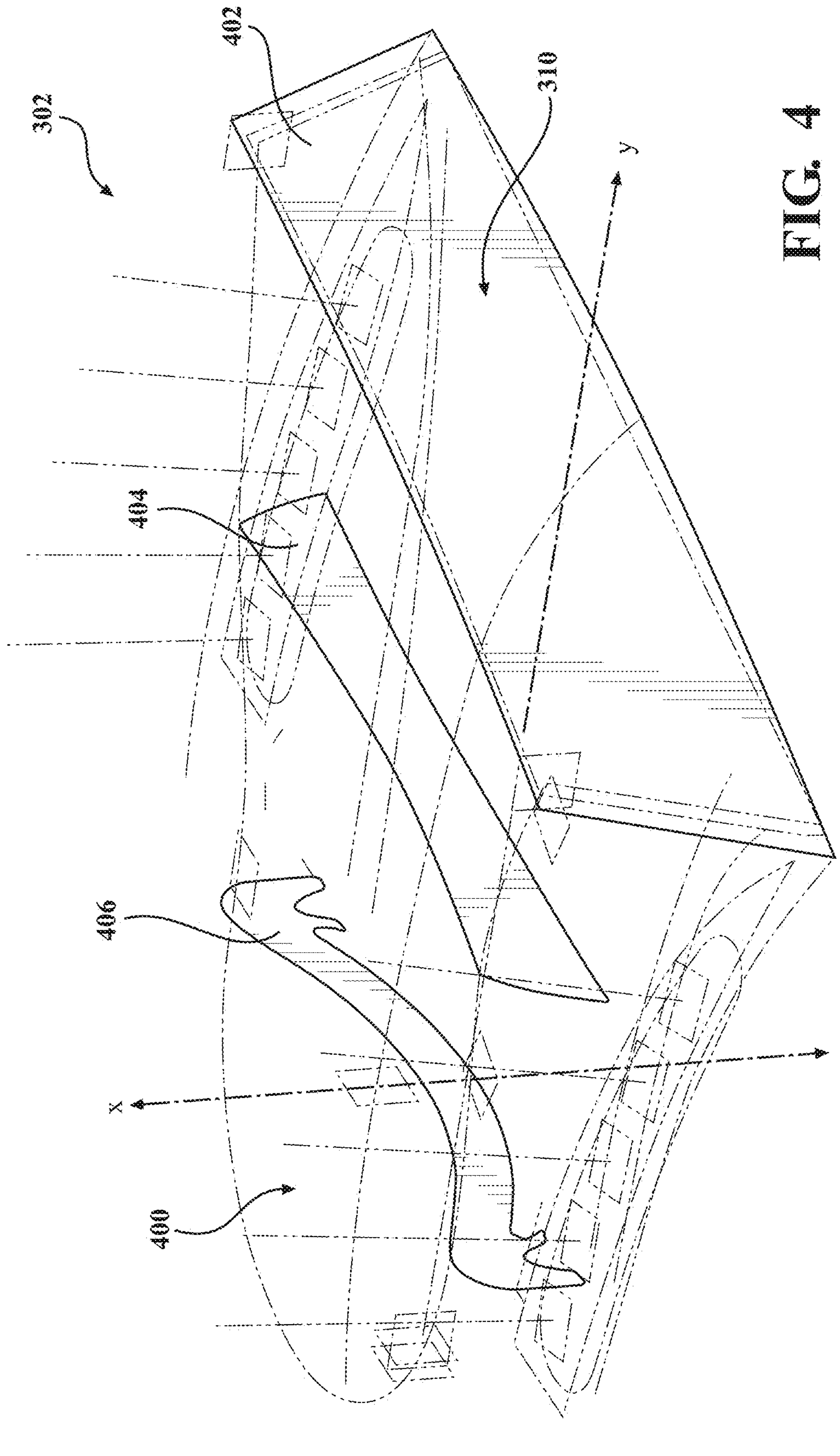
FIG. 4 is an interior view of one or more embodiments of a waveguide of the loudspeaker module.

FIG. 4 is an interior view of the waveguide 302. An open area 400 inside the waveguide 302 is normal to the first opening (not shown in FIG. 4) and has a curved shape to direct acoustical paths from the loudspeaker driver (not shown in FIG. 4) in a listening direction toward the forward direction, y. The open area 400 of the waveguide 302 is normal to the lateral direction, x, of the acoustical path, and the open area 400 increases from the first opening (not shown) to the exit opening 310.

Figure 5:
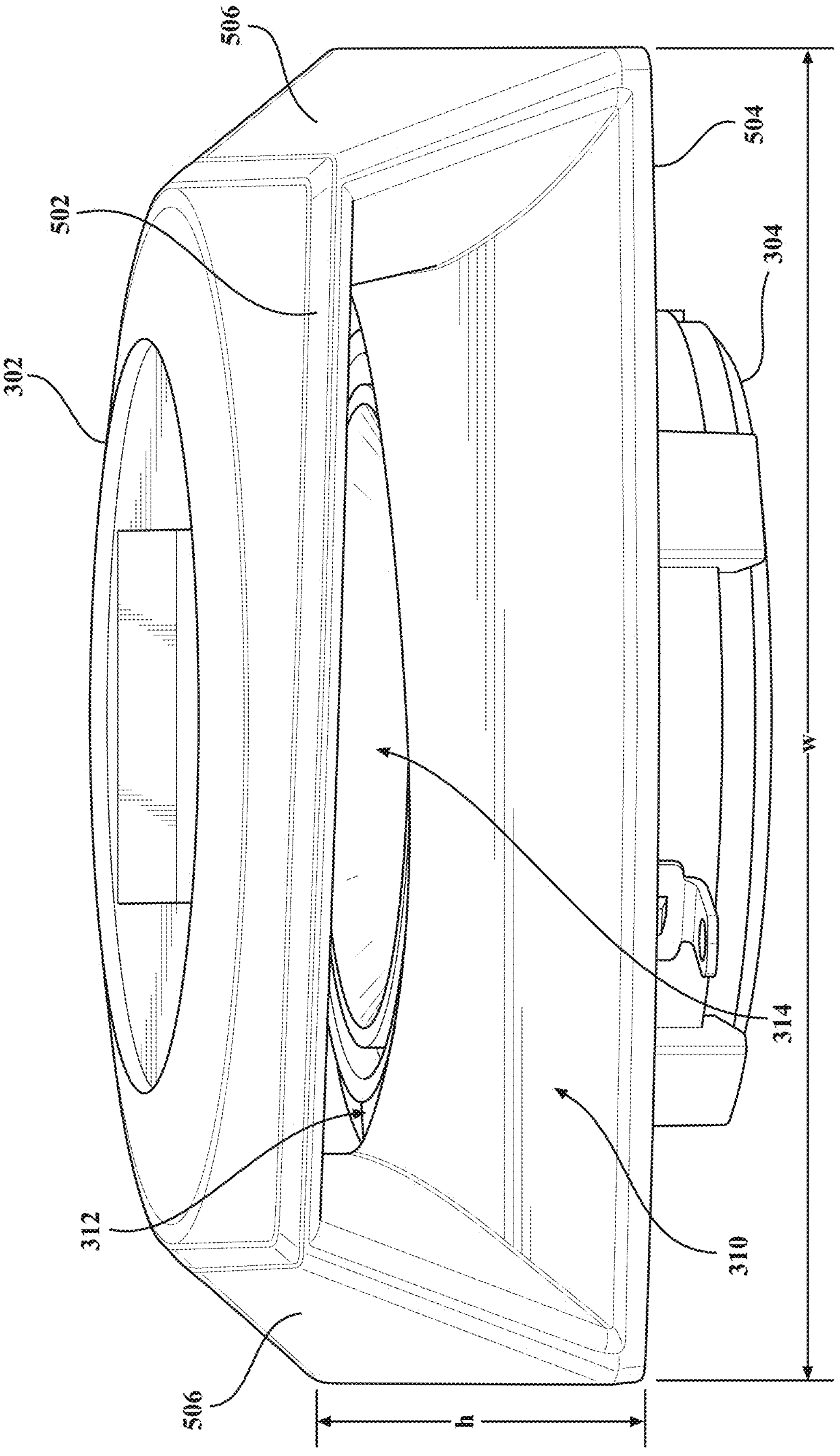
FIG. 5 is an end view of one or more embodiments of the waveguide and the loudspeaker driver.

FIG. 5 is an end view of the waveguide 302 and the loudspeaker driver 304. The exit opening 310 is a slot-shaped elongated opening having a height dimension, h, that is smaller than a width dimension, w. The exit opening 310 may not be symmetric. An upper wall 502 may have a width, w, that is different than the width, w, of a lower wall 504. Outer walls, 506 may slope so that the height and cross-section of the open area inside the waveguide 302 is increasing from the first opening 312 to the exit opening 310. The open area of the waveguide 302 is normal to the lateral direction, x, of the acoustical path and increases from the first opening 312 to the exit opening 310.

When the waveguide is positioned on the lateral side non-contact surface of the headrest 100, the height dimension, h, is in the lateral direction, x. The width dimension, w, is positioned vertically on the lateral side non-contact surface of the headrest 100.

Figure 6:
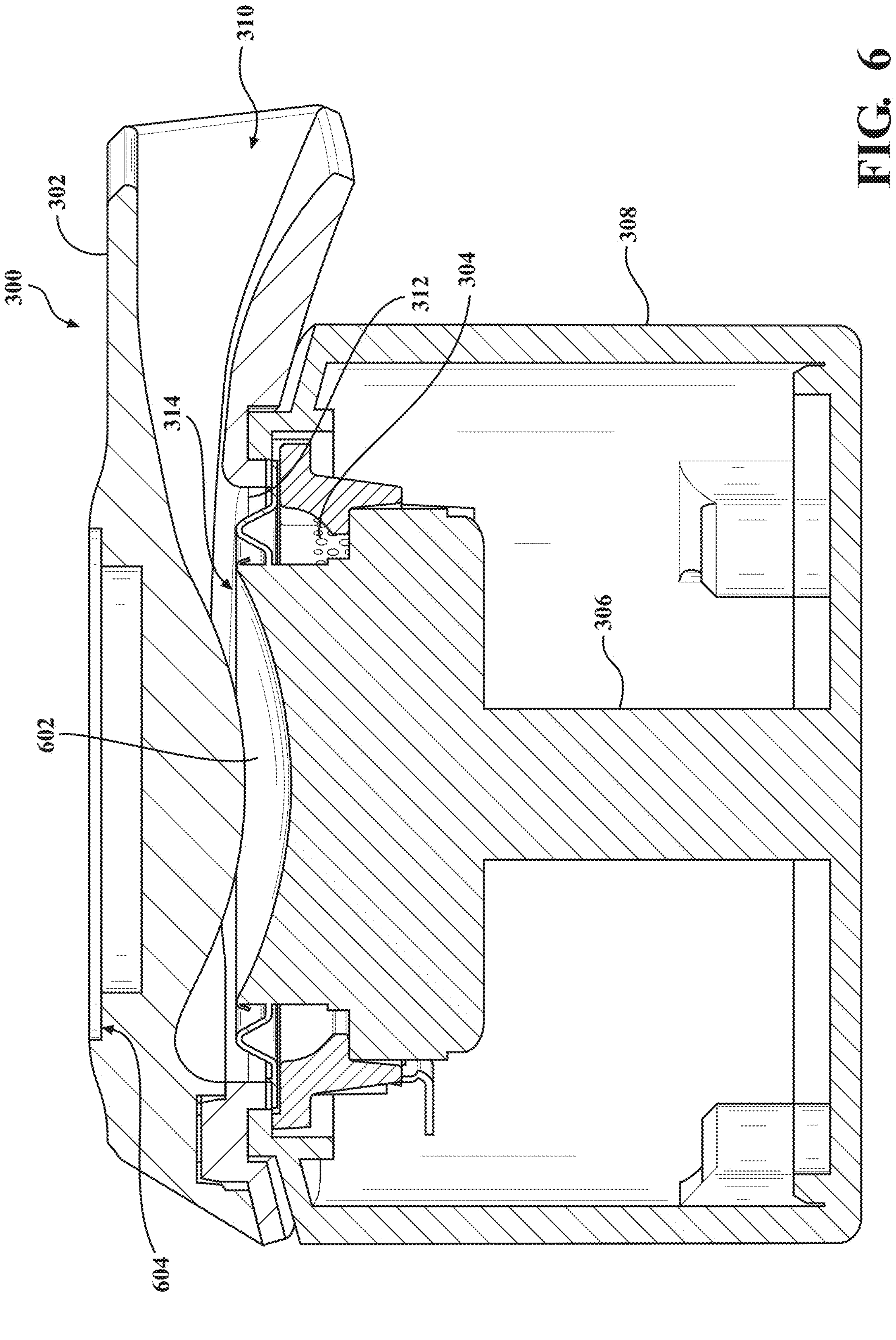
FIG. 6 is a cutaway side view of one or more embodiments of the loudspeaker module.

FIG. 6 is a cutaway side view of the loudspeaker module 300. An acoustic lens 602 is mounted to an underside 604 of an interior surface of the waveguide 302, just above the loudspeaker driver 304. The loudspeaker driver 304 transmits audio that passes through the acoustic lens 602. The waveguide 302 blocks the audio from passing through the acoustic lens in the lateral direction, x, and evenly redirects air pressure in front of a diaphragm of the loudspeaker driver 304 to direct audio through the open area and toward the exit opening 310. The shape of the acoustic lens 602 extends as a continuation of an interior upper surface of the open area inside the horn waveguide 302.

Referring back to FIG. 4, the open area 400 inside the waveguide 402 increases between the first area (not shown in FIG. 4) and the exit opening 310 to prevent the waveguide from acting as a resonator and to optimize the acoustic coupling of the loudspeaker driver (not shown in FIG. 4) to the air. For example, in one or more embodiments, an area 402 of the exit opening 310, shown shaded in FIG. 4, may be on the order of 375% larger than an area 404 of a mid-section profile of the open area. An area 406 of the horn opening over the loudspeaker driver (not shown) may be on the order of 35% smaller than the area 404 of the mid-section profile of the open area.

While exemplary embodiments are described above, it is not intended that these embodiments describe all possible forms of the invention. Rather, the words used in the specification are descriptive rather than limiting, and it is understood that various modifications may be made without departing from the scope of the invention. For example, In one or more embodiments shown in FIGS. 1 and 2, the waveguide 302 is mounted exteriorly of the headrest (not shown) so that the opening 310 of the waveguide 302 directs audio in the forward direction, y, generally away from the lateral direction, x. Alternatively, (not shown), the waveguide 302 may be positioned inside the headrest with the housing and only the opening 310 may be visible from the exterior of the right and left lateral surfaces of the headrest 100. Additionally, the features of various embodiments may be combined to form further embodiments.

The invention claimed is:

1. A loudspeaker module for mounting in a headrest, the loudspeaker module comprising:

a first loudspeaker driver mounted inside the headrest behind a first lateral non-contact surface of the headrest and oriented so that a central axis of radiation is along a lateral direction, x, of the headrest;

a first waveguide having a first opening in the lateral direction, x, and an exit opening in a forward direction, y, that is generally perpendicular to the lateral direction, x, the first waveguide is mounted to the first loudspeaker driver so that the first opening aligns with a radiating surface of the first loudspeaker driver and the exit opening extends along the first lateral non-contact surface of the headrest exteriorly to the headrest, the first exit opening is vertically oriented on the first lateral non-contact surface of the headrest so that a central axis of radiation of the waveguide is directed toward the forward direction, y.

2. The loudspeaker module of claim 1, further comprising an acoustic lens mounted to an underside of the first waveguide above the first loudspeaker driver.

3. The loudspeaker module of claim 1, wherein an entirety of the first waveguide is mounted exteriorly to the first lateral non-contact surface of the headrest.

4. The loudspeaker module of claim 1, wherein the exit opening extends a listening direction toward the forward direction, y, in a manner that does not converge toward a centerline of the headrest.

5. The loudspeaker module of claim 1, wherein an open area inside the first waveguide increases in size from the first opening to the exit opening.

6. The loudspeaker module of claim 1, wherein the exit opening is longer in a direction perpendicular to the central axis of radiation of the first loudspeaker driver than in a direction parallel to the central axis of radiation of the first loudspeaker driver.

7. The loudspeaker module of claim 1, wherein;

the exit opening has an upper wall with a length that differs from a lower wall of the exit opening; and the exit opening has lateral walls that slope from the upper wall to the lower wall.

8. The loudspeaker module of claim 1, further comprising a second loudspeaker module for mounting in the headrest, the second loudspeaker module comprising:

a second loudspeaker driver mounted inside the headrest behind a second lateral non-contact surface of the headrest and oriented so that a central axis of radiation is along a lateral direction, x, of the headrest;

a second waveguide having a first opening in the lateral direction, x, and an exit opening in a forward direction, y, that is generally perpendicular to the lateral direction, x, the second waveguide is mounted to the second loudspeaker driver so that the first opening aligns with a radiating surface of the second loudspeaker, the exit opening of the second waveguide extends along the second lateral non-contact surface of the headrest exteriorly to the headrest, the first exit opening of the second waveguide is oriented so that the central axis of radiation is directed away from the lateral direction, x, toward the forward direction, y; and the first and second loudspeaker drivers are spaced apart from each other.

9. The loudspeaker module of claim 8, further comprising an acoustic lens mounted to an underside of the second waveguide above the second loudspeaker driver.

10. The loudspeaker module of claim 8, wherein an entirety of the first waveguide is mounted exteriorly to the first lateral non-contact surface of the headrest and an entirety of the second waveguide is mounted exteriorly to the second lateral non-contact surface of the headrest.

11. The loudspeaker module of claim 8, wherein the exit opening extends a listening direction toward the forward direction y, in a manner that does not converge toward a centerline of the headrest.

12. The loudspeaker module of claim 8, wherein;

an open area inside the first waveguide increases in size from the first opening to the exit opening; and an open area inside the second waveguide increases in size from the first opening to the exit opening.

13. The loudspeaker module of claim 8, wherein the exit opening in each of the first and second waveguides is longer in a direction perpendicular to the central axis of radiation of each of the first and second loudspeaker drivers than in a direction parallel to the central axis of radiation of the first and second loudspeaker drivers.

14. The loudspeaker module of claim 8, wherein;

the exit opening of each of the first and second waveguides has an upper wall with a length that differs from a lower wall of the exit opening; and the exit opening of each of the first and second waveguides has lateral walls that slope from the upper wall to the lower wall.

15. A loudspeaker assembly for mounting in a headrest, the loudspeaker assembly comprising;

a pair of loudspeaker drivers mounted inside the headrest spaced apart from each other and oriented so that a central axis of radiation of each of the loudspeaker drivers is in a lateral direction, x;

a pair of waveguides, each of the waveguides in the pair of waveguides has a first opening and an exit opening, each of the waveguides in the pair of waveguides extends from each of the loudspeaker drivers in the pair of loudspeaker drivers, respectively, at the first opening of the waveguide, each of the waveguides in the pair of waveguides is configured to direct audio at a listening direction through an exit opening, the exit opening extends exteriorly to the headrest and has a central axis of radiation that is perpendicular to the central axis of the loudspeaker driver; and wherein the exit opening extends a listening direction along the central axis of radiation of the waveguide in a non-converging manner.

16. The loudspeaker assembly of claim 15, further comprising an acoustic lens mounted to an underside of each waveguide above each loudspeaker driver.

17. The loudspeaker assembly of claim 15, wherein an entirety of each waveguide is mounted exteriorly to the headrest.

18. The loudspeaker assembly of claim 15, wherein a cross-section of an open area inside the waveguide increases from the first opening to the exit opening.

19. The loudspeaker assembly of claim 15, wherein the exit opening is larger in a direction perpendicular to the central axis of radiation of the waveguide than in a direction parallel to the central axis of radiation of the waveguide.

20. The loudspeaker assembly of claim 15, wherein:

the exit opening has an upper wall with a length that differs from a lower wall of the exit opening; and the exit opening has lateral walls that slope from the upper wall to the lower wall.

* * * * *